US007763135B1

(12) United States Patent
Maltas et al.

(10) Patent No.: US 7,763,135 B1
(45) Date of Patent: Jul. 27, 2010

(54) METHOD FOR FORMING AN ELASTIC LABELING BAND

(75) Inventors: Jeffrey S. Maltas, Sibley, IA (US); Ronald G. Story, Irvine, CA (US); Jeffrey D. Tschetter, Sioux Falls, SD (US); Justin C. King, Rushmore, MN (US); Guy B. Longbrake, Rushmore, MN (US); Michael E. Pederson, Lewiston, MT (US)

(73) Assignee: Bedford Industries, Inc., Worthington, MN (US)

( * ) Notice: Subject to any disclaimer, the term of this patent is extended or adjusted under 35 U.S.C. 154(b) by 319 days.

(21) Appl. No.: 11/924,390

(22) Filed: Oct. 25, 2007

Related U.S. Application Data

(60) Provisional application No. 60/854,125, filed on Oct. 25, 2006.

(51) Int. Cl.
*B29C 65/52* (2006.01)

(52) U.S. Cl. ........................... 156/70; 40/665; 156/269; 156/289

(58) Field of Classification Search ................... 40/665; 156/70, 269, 289
See application file for complete search history.

(56) References Cited

U.S. PATENT DOCUMENTS

| | | | | |
|---|---|---|---|---|
| 92,895 | A | 7/1869 | Southworth | 40/27 |
| 109,263 | A | 11/1870 | Southworth et al. | 40/27 |
| 161,145 | A | 3/1875 | Hutchinson | |
| 212,578 | A | 2/1879 | Smith | |
| 224,958 | A | 2/1880 | Rowland | |
| 381,879 | A | 4/1888 | Howard | |
| D28,619 | S | 5/1898 | McFadden | |
| 1,221,572 | A | 4/1917 | Morton | |
| 1,397,079 | A | 11/1921 | Cohen | |
| 1,830,410 | A | 11/1931 | Schaaf et al. | |
| 1,929,320 | A | 10/1933 | Lulham | |
| 2,194,220 | A | 3/1940 | Elder | |
| 2,516,292 | A * | 7/1950 | Bennett | 40/665 |
| 2,669,047 | A | 2/1954 | Rieger | |
| 3,164,250 | A | 1/1965 | Paxton | |
| 3,545,795 | A | 12/1970 | Hertel | |
| 3,602,957 | A | 9/1971 | Chang | 24/16 |

(Continued)

FOREIGN PATENT DOCUMENTS

| | | |
|---|---|---|
| NL | 1016806 | 6/2002 |

(Continued)

*Primary Examiner*—Kat Wyrozebski
*Assistant Examiner*—Daniel Lee
(74) *Attorney, Agent, or Firm*—Westman, Champlin & Kelly, P.A.

(57) ABSTRACT

Disclosed is a method of forming an elastic labeling band. The method includes covering a central portion of a web of tag material with a release agent, advancing the web of tag material longitudinally and disposing a layer of molten elastomer over the advancing web of tag material, including over the release agent on the central portion thereof. The layer of molten elastomer is disposed over the web of tag material so that the elastomer bonds only to those portions of the web not covered with the release agent. The method includes curing the elastomer to define, with the web bonded thereto, an advancing web assembly, and separating a longitudinal segment from the web assembly to define an elastic labeling band.

20 Claims, 9 Drawing Sheets

U.S. PATENT DOCUMENTS

| | | | | |
|---|---|---|---|---|
| 3,621,809 | A | 11/1971 | Paxton | |
| 3,749,622 | A | 7/1973 | Sato et al. | |
| 3,777,378 | A | 12/1973 | Sant'Anselmo | |
| 3,896,524 | A | 7/1975 | Parker | 24/17 B |
| 3,930,506 | A | 1/1976 | Overend | |
| 3,933,560 | A | 1/1976 | Muttera | |
| 3,955,656 | A | 5/1976 | Kashinski | 190/41 R |
| 4,079,875 | A * | 3/1978 | Zodrow | 225/96 |
| 4,119,449 | A | 10/1978 | Gould et al. | |
| D251,121 | S | 2/1979 | Smith | |
| 4,341,303 | A | 7/1982 | Britt | 206/343 |
| 4,390,095 | A | 6/1983 | Cunningham | 206/150 |
| 4,407,082 | A | 10/1983 | Stehouwer | |
| 4,433,498 | A | 2/1984 | Bienz | 40/634 |
| 4,519,178 | A | 5/1985 | Crabb, Jr. | |
| 5,087,306 | A | 2/1992 | Cheung et al. | |
| 5,279,019 | A | 1/1994 | Knickle | 24/17 B |
| 5,322,724 | A | 6/1994 | Levens | |
| 5,348,781 | A | 9/1994 | Koblella | |
| 5,367,752 | A | 11/1994 | Petty | 24/301 |
| 5,467,897 | A | 11/1995 | Williams | 222/107 |
| 5,531,696 | A | 7/1996 | Menes | 604/131 |
| 5,617,656 | A | 4/1997 | Ludlow et al. | |
| D386,211 | S | 11/1997 | Taparauskas, Jr. | |
| 5,697,177 | A | 12/1997 | Ludlow et al. | |
| 5,733,652 | A * | 3/1998 | Stowman et al. | 428/343 |
| 5,778,583 | A | 7/1998 | Larsen | |
| 6,024,225 | A | 2/2000 | Van der Donk et al. | |
| 6,058,639 | A | 5/2000 | Tinklenberg et al. | |
| 6,116,653 | A | 9/2000 | Oberholzer et al. | 283/74 |
| 6,279,255 | B1 | 8/2001 | Larsen | |
| 6,381,890 | B1 | 5/2002 | Sjöstedt | 40/637 |
| D532,049 | S | 11/2006 | Ludlow | D20/22 |
| 7,281,345 | B2 | 10/2007 | Ludlow et al. | 40/665 |
| 2003/0150919 | A1 | 8/2003 | Blank | |
| 2005/0138854 | A1 | 6/2005 | Simmons | |
| 2005/0166439 | A1 * | 8/2005 | Ludlow et al. | 40/665 |
| 2005/0173073 | A1 | 8/2005 | Chernoff | |
| 2006/0086028 | A1 | 4/2006 | Vaughan | |

FOREIGN PATENT DOCUMENTS

| | | |
|---|---|---|
| WO | 2007/084119 | 7/2007 |

* cited by examiner

METHOD FOR FORMING AN ELASTIC LABELING BAND

CROSS-REFERENCE TO RELATED APPLICATION

The present application is based on and claims the benefit of U.S. provisional patent application Ser. No. 60/854,125, filed Oct. 25, 2006, the content of which is hereby incorporated by reference in its entirety.

BACKGROUND

This disclosure relates to a method of forming an elastic labeling band, and specific designs for such article labeling bands.

It is known to use an elastic material to affix a label or tag to an article such as a product package, bottle or the like. In those instances where the article being tagged has an irregular shape or if it is desired to bind several articles together, the elastic material must be resilient enough to be placed around the article (e.g., a watermelon, bunch of asparagus, large container or other item) yet maintain its labeling function without distortion to the label. In many cases, the label may include not only human detectable indicia, but also machine detectable indicia (e.g., a UPC bar code). In addition, the label and its elastic fastening component must be strong enough to stand the rigors of transport and handling, and retain itself in position on the article without damage thereto.

SUMMARY

In one aspect, the disclosure relates to a method of forming an elastic labeling band comprising covering a central portion of a web of tag material with a release agent, and advancing the web of tag material longitudinally. The method further comprises disposing a layer of molten elastomer over the advancing web of the tag material, including over a release agent on the central portion thereof, so that the elastomer bonds only to those portions of the web not covered with the release agent, curing the elastomer to define, with the web bonded thereto, an advancing web assembly, and separating a longitudinal segment from the web assembly to define an elastic labeling band.

This summary is provided to introduce a selection of one or more concepts in a simplified form that are further described below in the Detailed Description. This summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure is referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure. It should be understood that the figures have not been drawn to scale as it has been necessary to enlarge certain portions for clarity of illustration.

DETAILED DESCRIPTION

Figure 1:
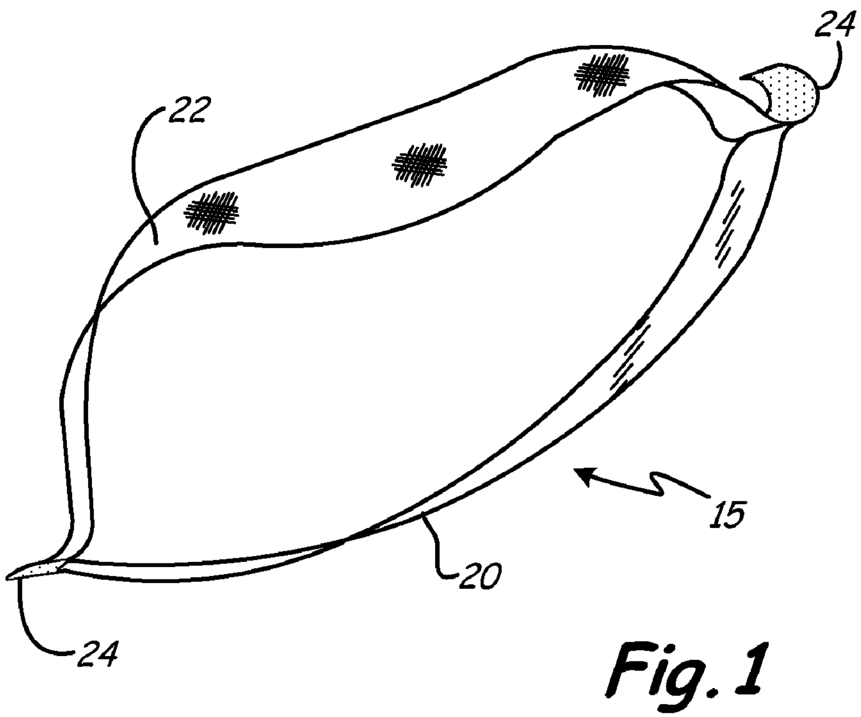
FIGS. 1 and 2 are perspective views of one embodiment of an elastic labeling band.
Figure 2:
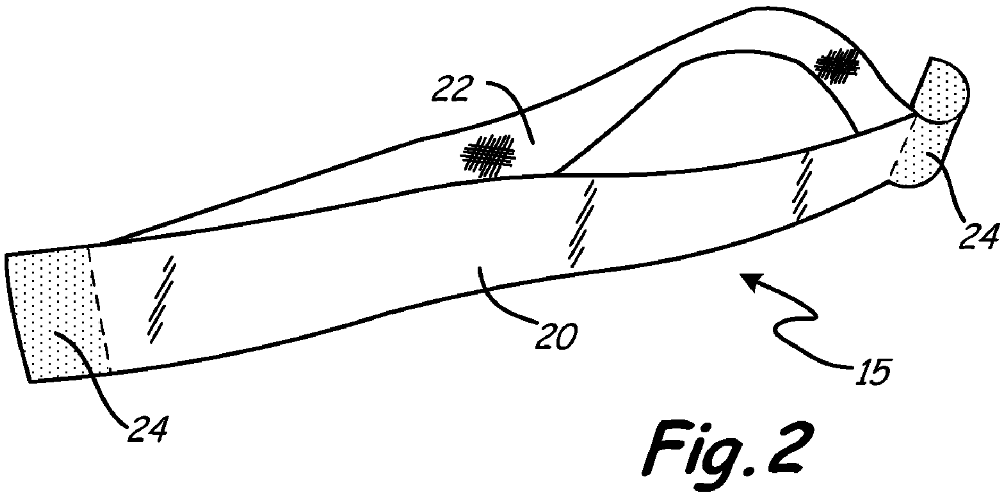

FIGS. 1 and 2 illustrate one embodiment of an elastic article labeling band 15. The labeling band 15 essentially includes a tag portion 20 connected to flexible securing mechanism 22 (e.g., a strip of elastomer material). In this case, each end of the tag portion 20 is connected to an end of the flexible securing mechanism 22. In fact, in the illustrated embodiment, the ends of the securing mechanism 22 are matched up with the ends of the tag portion 20 (there could just as easily be an offset of one end from the other). The overlapping of materials at each of the two points of connection forms a flap of sorts (e.g., flaps 24, 24). Throughout the various figures herein, the bond area between the tag portion and securing mechanism is indicated by stippling.

Figure 3:
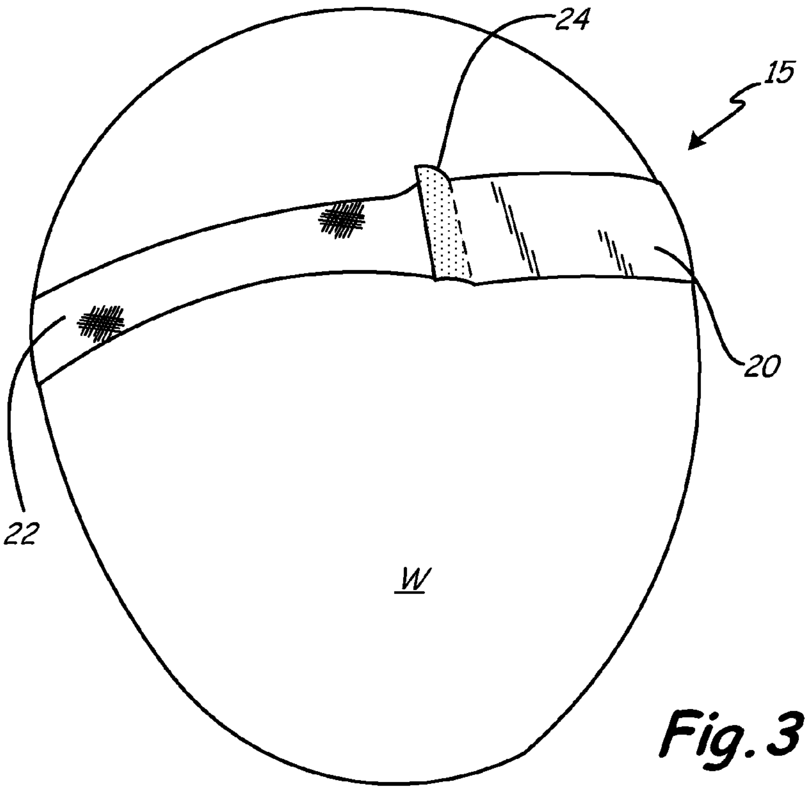
FIG. 3 illustrates the labeling band of FIGS. 1 and 2 attached about an article such as a watermelon.

FIG. 3 shows the labeling band 15 of FIGS. 1 and 2 attached to a watermelon W. The tag portion 20 is on the right side of the watermelon W. In one embodiment, the visible surface of the tag portion 20 is white. In alternate embodiments, the white surface is instead a visible or otherwise detectable (e.g., tactile, machine readable, etc.) presentation of information. The flexible securing mechanism 22 is on the left side of FIG. 3, and in one embodiment it may be relatively clear (e.g., transparent or translucent). For the labeling bands of this disclosure, the bond between the tag portion 20 and the flexible securing mechanism 22 is placed in tension when the labeling band 15 is in use (e.g., secured to a watermelon W).

To apply the labeling band 15, the flexible securing mechanism 22 is illustratively pulled away from the tag portion 20. The fruit or other article(s) is then inserted into the opening formed between the securing mechanism 22 and the tag portion 20. The securing mechanism 22 is then released. When the labeling band 15 is secured to the article (e.g., watermelon W), the distance from one end of the securing mechanism 22 to the other is longer than it is when the labeling band 15 is sitting loosely, for example, on a table as shown in FIG. 1. In other words, the flexible securing mechanism 22 extends (i.e., stretches) to accommodate the article, and then, after release, remains extended to some extent while engaged about the article. The securing mechanism 22 is constructed of a material that is biased toward the non-extended position (e.g., an elastic material).

Of course, the labeling band 15 is most useful when applied to an item that is larger in diameter than the diameter of the opening formed between the tag portion 20 and the securing mechanism 22 in its relaxed state. Those skilled in the art will appreciate that labeling bands such as those described here can be constructed to accommodate items of any size. In other words, the diameter of the opening formed between the tag portion and the securing mechanism in its relaxed state can be selectively constructed to accommodate items of different sizes.

In FIG. 3, the connection flap 24 is shown projecting outwardly from the watermelon W. Turning the labeling band 15 inside-out disposes the connection flaps 24 on the inside thereof, next to the watermelon W.

Figure 4:
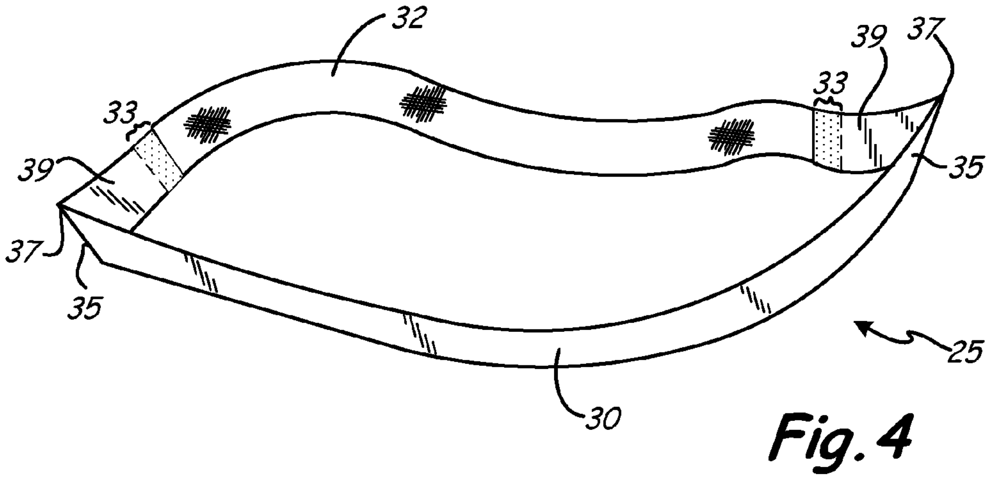
FIGS. 4 and 5 are perspective views of an alternative embodiment of an elastic labeling band.
Figure 5:
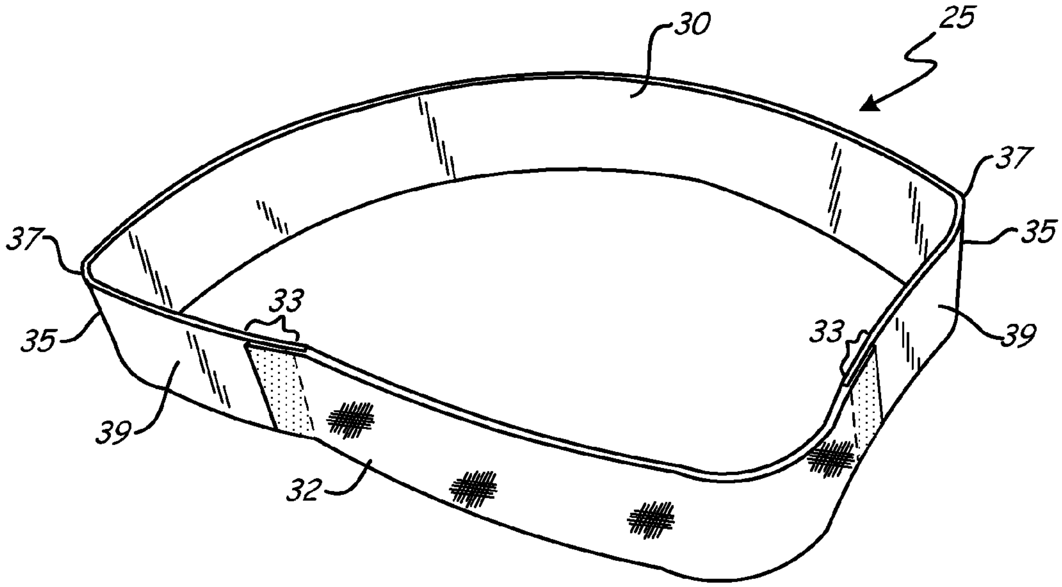

FIGS. 4 and 5 illustrate an alternate embodiment of the elastic labeling band, identified as labeling band 25. In this case, a tag portion 30 and a flexible attachment mechanism 32 are still overlapped at a point of connection at each end of the securing mechanism (e.g., connection zones 33), and are made of materials having the characteristics describe above for labeling band 15. However, at each point of connection, the end of the securing mechanism 32 is displaced from an outer end edge 35 of the tag portion 30, with the connection zone 33 therebetween. A fold 37 is formed adjacent each outer end edge 35 of the tag portion 30 and each end of the securing mechanism 32 is overlapped and affixed to the respective end of the tag portion 30 on a shorter, folded over portion 39 of the tag portion 30. Thus, in this case, the connection flaps 24, 24 shown in FIGS. 1, 2 and 3 have been eliminated.

The tag portion of the elastic labeling band must have sufficient structure that it can be bonded to the securing mechanism. In some embodiments, it may be desirable to dispose visual or otherwise detectable indicia on the tag portion. For instance, the tag portion may bear printed product or brand information regarding the article upon which it is to be mounted. Likewise, information may also be disposed on the securing mechanism (although, in use, the securing mechanism will be stretched, and presentation of such information thereon affected). Thus, it may be desirable to treat the intended visible surfaces of the materials to accept printing thereon or to enhance the visibility of information disposed thereon (e.g., such as applying a coating to the front side (indicia bearing side) of the tag portion).

Web-based processing may be the most ideal process for the manufacture of elastic labeling bands from a standpoint of economy, although batch processing and conveyor processing with indexing from station to station for specific operations can be useful (especially for uniquely designed or shaped tags or elastic layers). In web-based processing, the web of tag material (which may be polystyrene) would be given a surface treatment such as the well known corona surface treatment and then the web is repetitively printed with informational matter as intended for each elastic labeling band to be later cut from it. The printed tag material web is fed simultaneously with molten elastomer (e.g, a thermoplastic elastomer such as styrenic block copolymer) through the nip of chill rollers. The molten elastomer is applied to extend laterally as a layer over the web, as it is advanced. The temperatures of the chill rollers (from about 200° F. to about 40° F.) are adjusted to cool the molten elastomer to a "frozen" state while simultaneously applying pressure by the rollers (up to 500 psi) to effect the formation of a layer of elastomer at the thickness desired (e.g., 16 mil) and also to effect formation of bond zones between the elastomer and the tag material (such as the connection flats 24 illustrated in FIGS. 1 and 2 or the connection zones 33 illustrated in FIGS. 4 and 5).

In one embodiment, a release agent is disposed upon the tag portion in order to inhibit bonding of at least a portion of the flexible securing mechanism with the tag portion, such as, for example, during a molten elastomer extrusion process as described above. Regardless of whether the flapped configuration of FIGS. 1, 2 and 3 is implemented or instead the folded over configuration of FIGS. 4 and 5 is implemented, a release agent is illustratively aligned with the exposed back surface of the tag portion in order to inhibit adhesion thereof to at least a portion of the flexible securing mechanism. In one embodiment, the release agent is applied to all of tag portion back surface except the points of connection with the securing mechanism (e.g., along connection flaps 24 (FIGS. 1-3) or along bond connections 33 (FIGS. 4 and 5)).

In one embodiment, applications for the labeling bands described herein include, but certainly are not limited to, the wrapping and labeling of produce (e.g., watermelon, cantaloupe, etc.) and the wrapping and labeling of clamshell containers (such as take-home boxes from restaurants or other such containers that are hinged on one side). Smaller versions (i.e., with smaller band openings) can apply to smaller items (such as, e.g., asparagus, etc.).

In one embodiment, the labeling bands described herein are illustratively constructed in a manner such as described above. For example, the tag portion substrate is printed with product information. This material is then run through a laminator and combined with a securing mechanism (e.g., combined with a layer of molten elastomer). In the present case, the securing mechanism is placed in the middle of the tag portion substrate, and not merely on the ends thereof in one or two separate strips, such as disclosed in U.S. Pat. No. 7,281,345 and in pending international patent application no. PCT/US2006/001468, both of which are incorporated by reference herein. In the present case, the securing mechanism bonds to the ends of the substrate as desired, but not in the middle. The securing mechanism and the substrate are kept from bonding together in the middle (e.g., by a release agent added during the lamination step, or by a silicone or other slippery surface coating applied, e.g., during or after the printing step, etc.). In one embodiment, the release agent is a separate layer of material disposed between the tag portion substrate and the molten elastomer. This separate layer is then later removed from between the two labeling band materials, or remains bonded to one of the materials but not the other.

In one embodiment, after the elastomer has been bonded to the tag portion substrate, this continued web of material is then further processed to define individual labeling bands. A lateral cut may be made to separate each labeling band from the combined web, or the each labeling band may be initially defined by lateral perforations. Thus, the labeling bands are then later separated from the web, at a time desired, by tearing the perforations. A plurality of labeling bands may thus be provided in sheet form or in roll form for dispensing by an end user, at a time and place as desired.

For the elastic labeling band of the present disclosure, the bond strength between the tag material and the elastomer is placed in tension in use (such as, for example, as seen in FIG. 3). Thus, the tag and the elastomer material are selected for compatible bonding, or a suitable adhesive is used to bond them together.

Figure 6:
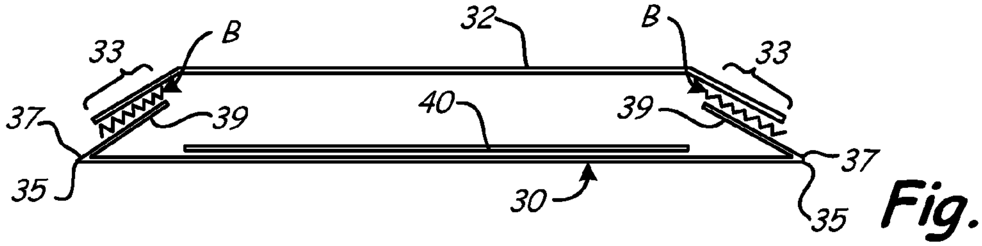
FIG. 6 is a schematic exploded view of the components of the elastic labeling band of FIGS. 4 and 5, prior to assembly thereof.

The elastic labeling band, as noted above, can be formed in at least two formats. The fold-over format illustrated in FIGS. 4 and 5 is further illustrated schematically in FIG. 6 with the components of the labeling band in an exploded, unassembled view. The tag portion or tag material 30 has a fold 37 adjacent each outer end edge 35 thereof, forming a folded over portion 39. At the point where the attachment mechanism (e.g., elastomer) overlaps with the folded-over portion, they are bonded together. The connection zones 33 illustrate this feature, with these bond areas or zones indicated generally as bond zones B in FIG. 6. FIG. 6 also illustrates the disposition of a release agent upon the tag portion 30, as indicated by release agent 40. As noted above, the release agent may be a coating material or may be a separate layer or sheet of material.

Figure 7:
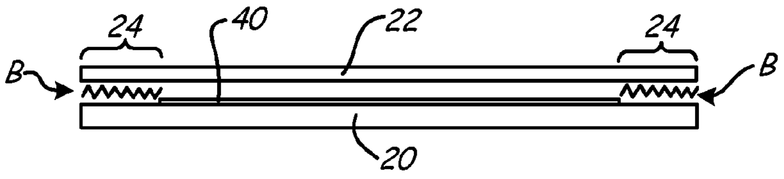
FIG. 7 is a schematic exploded view of the components of the elastic labeling band of FIGS. 1 and 2, prior to assembly thereof.
Figure 8:
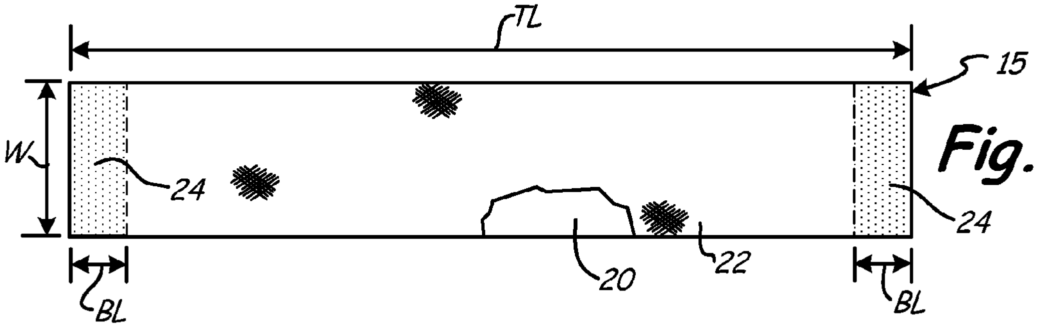
FIG. 8 is a plan view of an elastic labeling band of the type illustrated in FIGS. 1, 2 and 7.

FIG. 7 illustrates schematically the components of the elastic labeling band in FIGS. 1-3. The tag portion 20 is attached to the flexible securing mechanism 22 (e.g., elastomer) via the connection flaps 24, and these bond areas or zones are again illustrated as bond zones B in FIG. 7. In addition, a release agent 40, as described above, is also disposed between the tag portion 20 and securing mechanism 22 in FIG. 7, in between the flaps 24.

In either format of elastic labeling band, the release agent must be applied to the exposed back surface of the tag material in order to inhibit adhesion of the elastomer thereto. The tag material and the elastomer thus only adhere to each other in the bond zones (e.g., bond zones B as illustrated in FIGS. 6 and 7).

FIGS. 8, 9, 10 and 12 are plan views of alternate embodiments of the elastic labeling band of the present disclosure. In each of these FIGS., the labeling band is shown from its elastomer layer side and the bond zones between the elastomer layer and the tag material layer are indicated by stippling.

In one embodiment, the unstretched perimeter or circumference is twice the length of the tag material, minus the bond length between the tag portion and the securing mechanism. For instance, in the labeling band of FIG. 8, materials are selected for the labeling band such that a tag portion having an unstretched total length TL=8.5 inches (in the machine transverse direction) is connected to a securing mechanism that, when stretched, enables the total diameter of the labeling band to expand to at least 28 inches at full stretch. In this illustrated embodiment, the labeling band is formed in a manner of the labeling band 15 shown in FIGS. 1-3 and 7, with connection flaps 24 at its outer ends. Each connection flap 24 has a bond length BL=0.5 inches, and the labeling band 15 has a width W=1 inch (in the machine direction). In this embodiment, the unstretched diameter of the labeling band would be 15 inches $((8.5-(2\times0.5))\times2=15)$.

Figure 9:
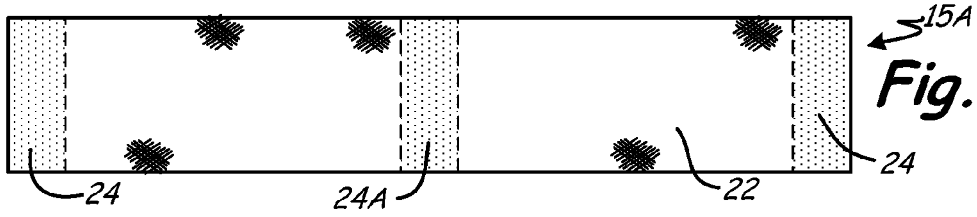
FIG. 9 is a plan view of an alternative elastic labeling band, wherein the tag layer and elastomer of the band are bonded together not only adjacent the ends of the band, but also adjacent along an intermediate portion.

FIG. 9 illustrates an alternative embodiment of an elastic labeling band 15A which has flexible securing mechanism 22 (e.g., a strip of elastomer material) connected to an underlying tag portion 20 at connection flaps 24. In addition, connection zone 24A is shown intermediate the connection zones 24. The connection zone 24A, the securing mechanism 22 and tag portion 20 are also bonded together. Connection zone 24A may be defined by running additional longitudinally extending areas of masked release coat or no release coat on the tag material web prior to elastomer lamination, in order to allow the formation of additional longitudinal bonds (e.g., such as bond zone 24A) that can be achieved between the securing mechanism 22 and tag portion 20. Thus, a single elastic labeling band 15A can have two loops formed thereon (or even more than two loops, if desired).

Figure 10:
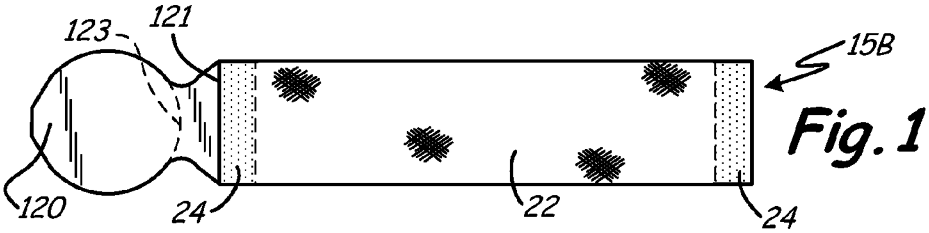
FIG. 10 is a plan view of an alternative elastic labeling band which has additional tag material extending laterally beyond an end bond between the layer of tag material and an elastomer layer.
Figure 11:
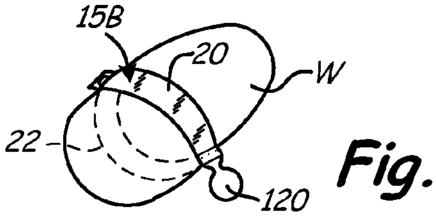
FIG. 11 is a perspective view of the labeling band of FIG. 10 in use about an item (e.g., a watermelon).

FIG. 10 illustrates another embodiment of an elastic labeling band 15B of the present disclosure. In this embodiment, additional tag material 120 extends outwardly past an edge 121 of the elastomer layer 22. In other words, the additional tag material 120 extends beyond the connection zone 24, as shown. This creates an additional ear of tag material 120 that extends outwardly for use, for example, for product identification purposes such as illustrated in FIG. 11. In one embodiment, a portion of the additional tag material area may be selectively separable from the remainder of the labeling band 15B. Such separation may be obtained by means of a perforation line 123, as illustrated in FIG. 10, and the separable portion may constitute a coupon.

Figure 12:
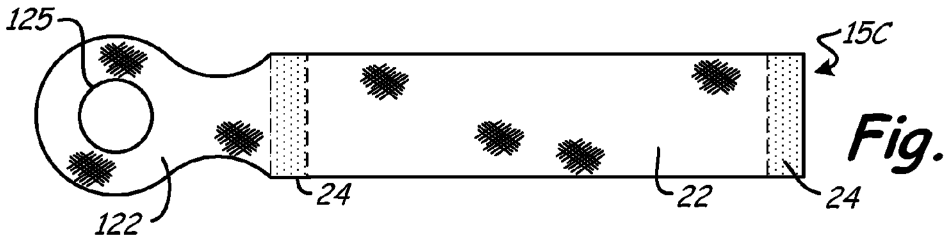
FIG. 12 is a plan view of an alternative elastic labeling band which has additional elastomer extending laterally beyond an end bond between a layer of tag material and an elastomer layer, wherein the additional elastomer is cut to form an elastomer loop.

FIG. 12 illustrates another embodiment of an elastic labeling band 15C in accordance with the present disclosure. In this embodiment, the labeling band 15C has an additional elastomer area that extends outwardly past one of the connection zones 24 between the elastomer layer 22 and tag material. The additional elastomer area, referenced at area 122 in FIG. 12, can be die cut to form an elastomer loop 125 or other fastener, such as illustrated in FIG. 12. In addition, an additional elastomer area may be provided on both ends of the labeling band 15C, although the area 122 on only one end is shown in FIG. 12. Once the labeling band 15C is applied to an item such as a watermelon W, the elastomer loop 125 can be used to secure additional articles to the watermelon (such as a carving knife or other complimentary product or produce (see FIG. 13)).

Figure 13:
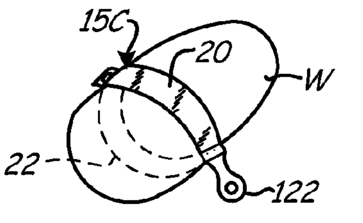
FIG. 13 is a perspective view of the labeling band of FIG. 12 in use about an article (e.g., a watermelon).

The ears (e.g., connection zones 24, additional tag material 120 or elastomer area 122) which project outwardly from a product (such as illustrated in FIGS. 3, 11 and 13) can be made to disappear by turning the elastic labeling band inside out so that those ears are then pressed against the product when bound thereon. The external side of the tag portion would thus be the side bearing the release code.

Figure 14:
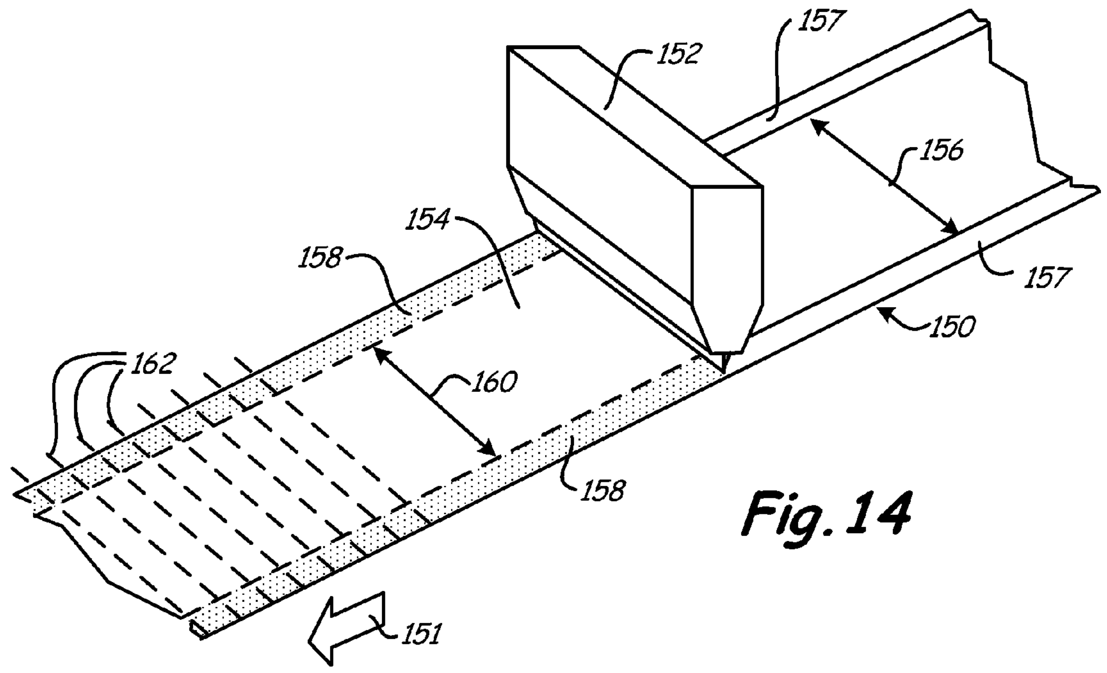
FIG. 14 illustrates schematically a process for making an elastic labeling band.

FIG. 14 illustrates schematically the process for making the elastic labeling band of the present disclosure. A web of tag material 150 is advanced longitudinally (in the direction of arrow 151) past an elastomer extruder 152 that disposes a layer of molten elastomer 154 onto the tag material web 150. A central portion 156 of the tag material web 150 has been previously coated with a release coat (or has another layer or sheet of material thereon) which prevents the elastomer from bonding to the tag material web 150 along that central portion 156. Along each lateral edge of the tag material web 150, uncoated longitudinally extending intended bond areas 157 are defined. As seen, the elastomer is disposed over the release agent on the central portion of the tag material web. Once the elastomer has cured, the elastomer layer 154 and tag material web 150 are thus only bonded together as a web assembly along spaced apart longitudinal strips or bond areas 158. The portion of the web assembly between the bond areas 158 (indicated as area 160) is not bonded together, which corresponds to the central portion 156 of the tag material web 150 that was covered with a release agent of some kind. Individual elastic labeling bands are then later separated from that web assembly in desired widths (such as width W in FIG. 8) as indicated by separation lines 162 in FIG. 14. Although the separation lines 162 are indicated as linear and laterally extending across the web assembly, it is contemplated that the separation lines need not be linear or laterally extending. For instance, the separation lines could be defined as curved lines or serpentine lines between adjacent labeling bands. In addition, labeling bands of other shapes (e.g., Y-shapes) could be formed by die cutting of portions of the web assembly as waste (e.g., the portion between the upright arms of the "Y").

Figure 15:
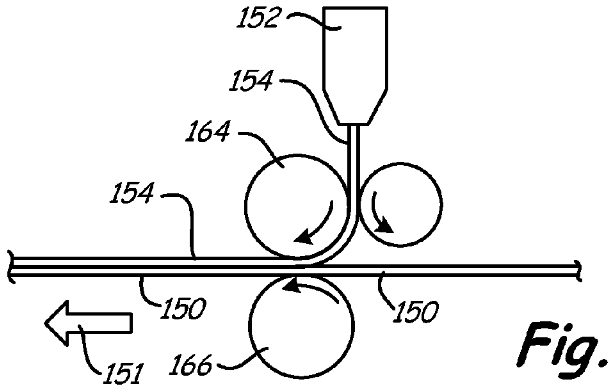
FIG. 15 illustrates one form of an application of molten elastomer to a tag material web, using an extrusion dye and a lamination roll.

FIG. 15 illustrates one form of an application of the elastomer 154 to the tag material web 150, such as by using an extrusion dye 152 and a lamination roll 164. The lamination roll 164 not only forms a layer of the elastomer 154 on top of the tag material web 150, but also bonds the two materials together by nip pressure between the lamination roll 164 and a backup roll 166 supporting the tag material web 150.

Figure 16:
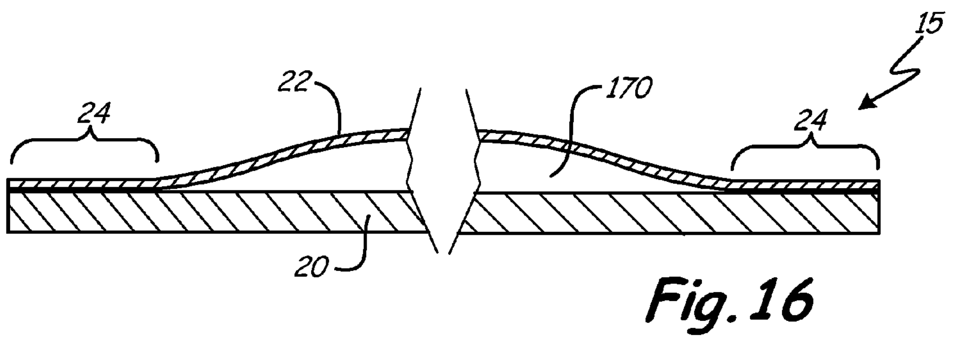
FIG. 16 illustrates, in section, an elastic labeling band as shown in FIGS. 1 and 2, with the elastomer layer stretched slightly outwardly relative to the layer of tag material.

FIG. 16 illustrates, in section, the elastic labeling band 15 of FIGS. 1-3 and 7, with the elastomer slightly stretched outward to illustrate the article-receptive loop 170 defined therebetween.

Figure 17:
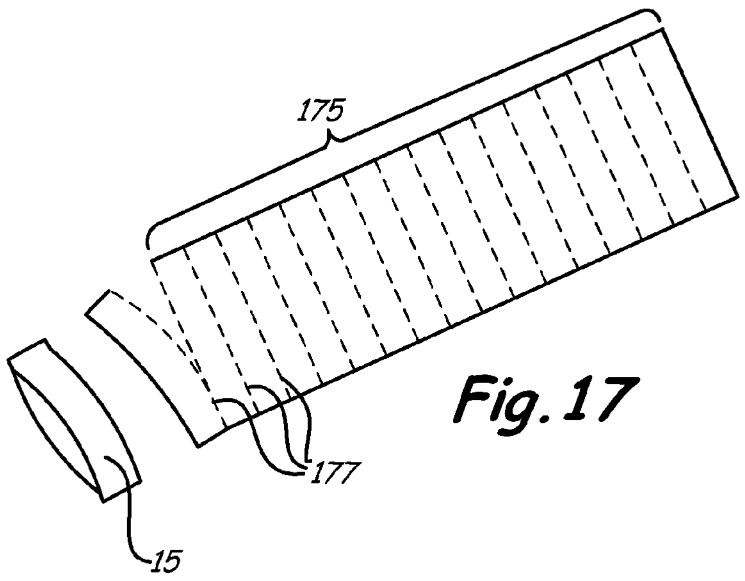
FIG. 17 illustrates a strip of elastic labeling bands after bonding, but prior to separation of labeling bands from the strip.

As noted above, individual elastic labeling bands may be severed from the bonded together web assembly (after sufficient curing of the elastomer) and processed and packaged for distribution and use. Alternatively, the bonded together web assembly may be laterally perforated to define weakened separation lines between adjacent elastic labeling bands (both the tag material and elastomer layer are perforated). Thus, a plurality of elastic labeling bands may be severed from the bonded together assembly and distributed in strip form, such as a strip of labeling bands 175 illustrated in FIG. 17, and each labeling band later separated from the strip 175 by tearing perforations 177 formed therebetween. In FIG. 17, one discrete elastic labeling band 15 is shown as already separated from the strip 175, and one labeling band is being shown in the process of being separated from the strip 175 along its respective connected perforations thereto. Such strips of labeling bands may be formed in various lengths, such as lengths bearing 3-5 bands, 10-15 bands, or even in longer lengths which may be fan folded and stacked for distribution and use.

Figure 18:
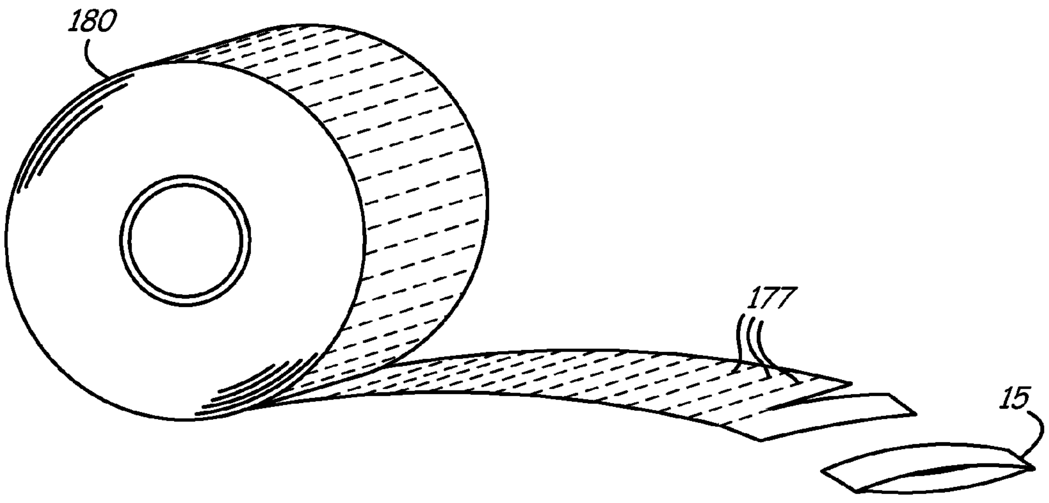
FIG. 18 illustrates a roll of elastic labeling bands after bonding, but prior to separation of discrete labeling bands therefrom.

An alternative elastic labeling band distribution configuration is shown in FIG. 18. Here, a strip of elastic labeling bands may be spooled into roll form 180, and then individual elastic labeling bands torn off of the roll 180 as desired by the perforations 177. In FIG. 18, one discrete labeling band is shown as having already been separated from the roll 180, while another labeling band is shown in the process of being separated from the roll 180 via its respective connected perforations.

Figure 19:
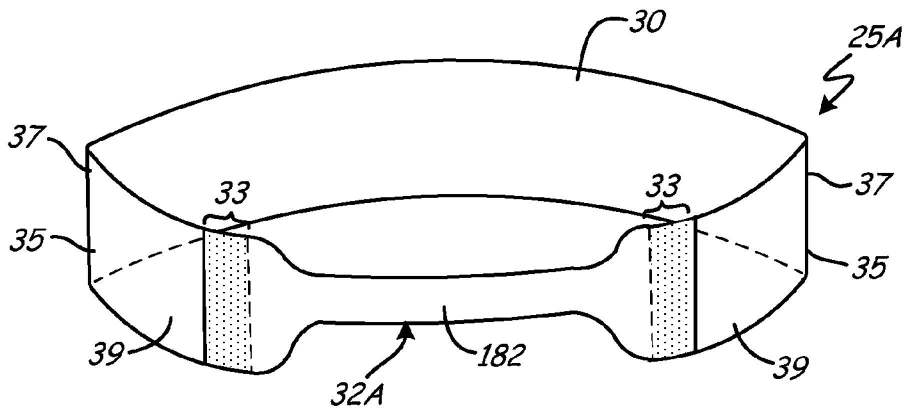
FIGS. 19-21 illustrate alternative elastic labeling band configurations, similar to the labeling band illustrated in FIGS. 4 and 5, but with alternate configurations for the elastomer layer thereon.
Figure 20:
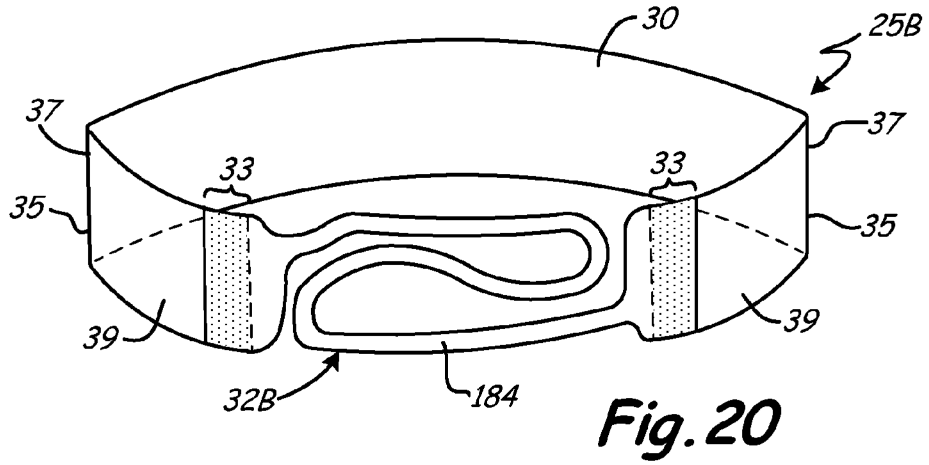
Figure 21:
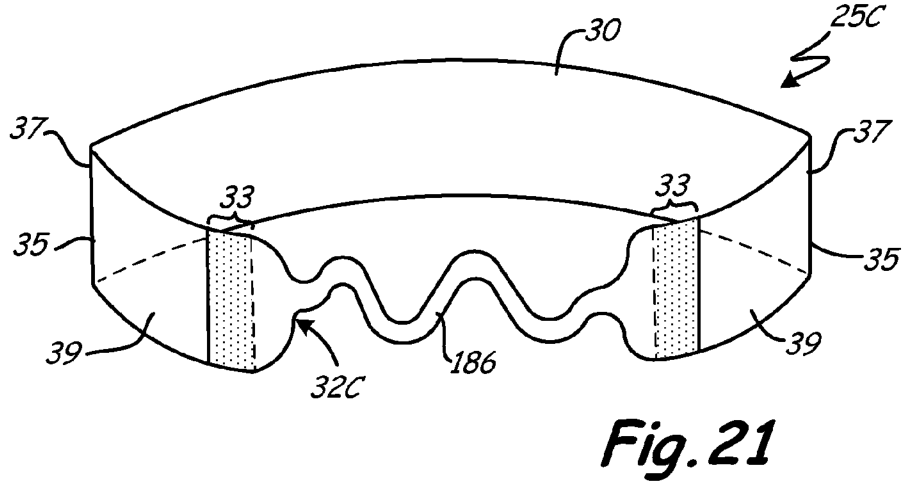

FIGS. 19-21 illustrate alternative embodiments of elastic labeling bands formed similarly to that disclosed in FIGS. 4, 5 and 6. In making this folded over type labeling band, the elastomer layer is not disposed (i.e., laminated) over the entire width of the web of tag material, but only across a central portion thereof spanning the ends of the folded over portions along with sides of the web, and extending partially thereover in order to define the connection zones therebetween.

FIG. 19 illustrates a folded over format elastic labeling band 25A of this disclosure. On labeling band 25A, the elastomer layer 32A is necked down or reduced in width between opposed ends of the tag material 30 (between the folded over portions 39 of the tag material 30). The elastomer layer 32A has a width comparable to the width of the tag material 30 adjacent each connection zone 33 therebetween, but then has a reduced width portion 182 between the connection zones 33. This configuration may reduce the stress placed on the bond area joint (connection zone 33) between the tag material 30 and the elastomer layer 32A by directing more of the stretch in the elastomer layer 32A to its reduced width section 182. The elastomer layer 32A may be kiss cut during processing to remove side portions thereof and to create the reduced width section 182 illustrated in FIG. 19.

FIG. 20 illustrates a folded-over format elastic labeling band 25B of this disclosure. On labeling band 25B, the elastomer layer 32B is readily reduced in width between opposing ends of the tag material 30 (between the folded over portion 39 of the tag material), but is also formed to define a length of elastomer between both opposed ends that is longer than the distance between the opposed ends. The elastomer layer 32B has a width comparable to the width of the tag material 30 adjacent each connection zone 33 therebetween, but then has a reduced width portion 184 between the connection zones 33, produced with the portion 184 snaking back and forth as shown in FIG. 20. Thus, the elastomer layer 32B can stretch to even further lengths than, for example, the elastomer layer 32A of the labeling band 25A of FIG. 19. Indeed, in its unstretched state (as seen in FIG. 20), the elastomer layer has a longer length (nearly three times the length of the unstretched elastomer of the labeling band of FIG. 19). This configuration may further reduce the stress placed on the bond area joint (connection zone 33) between the tag material 30 and the elastomer layer 32B by directing more of the stretch in the elastomer layer 32B to its reduced width section 184. Again, the elastomer layer 32B may be kiss cut during processing to remove excess portions thereof and to define the "switch back" or "Z-shaped" elastomer layer 32B illustrated in FIG. 20.

FIG. 21 illustrates a folded over format elastic labeling band 25C of this disclosure. On labeling band 25C, the elastomer layer 32C is necked down or reduced in width between opposed ends of the tag material 30 (between the folded over portions 39 of the tag material 30) and cut to define a length of the elastomer layer 32C between the opposed ends of the tag material that is longer than the distance between the opposed ends. The elastomer layer 32C has a width comparable to the width of the tag material 30 adjacent each connection zone 33 therebetween, but then has a reduced width portion 186 between connection zones 33. The reduced width portion 186, in this example, is serpentine in form. This configuration may reduce the stress placed on the bond area joint (connection zone 33) between the tag material 30 and the elastomer layer 32C by directing more of the stretch in the elastomer layer 32C to its reduced width section 186. Thus, the elastomer layer 32C can stretch further than the elastomer layers shown in the labeling bands of FIGS. 4, 5 and 6. Again, the elastomer layer 32C may be kiss cut during processing to remove excess portions thereof and to define the "S" or squiggle shaped elastomer layer 32C illustrated in FIG. 21.

Figure 22:
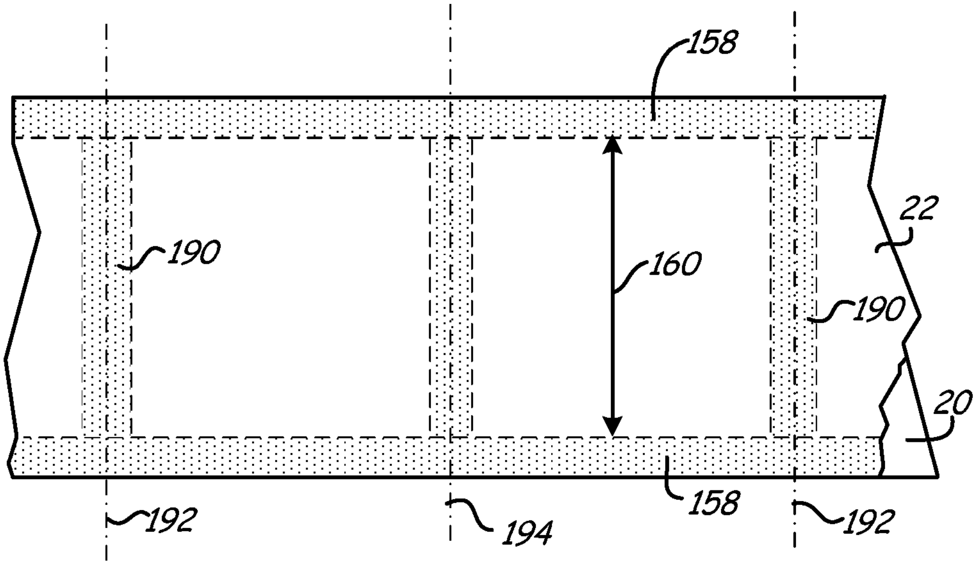
FIG. 22 is a plan view of an alternative process utilized for making pouches having one open end, one closed end and two closed sides.
Figure 23:
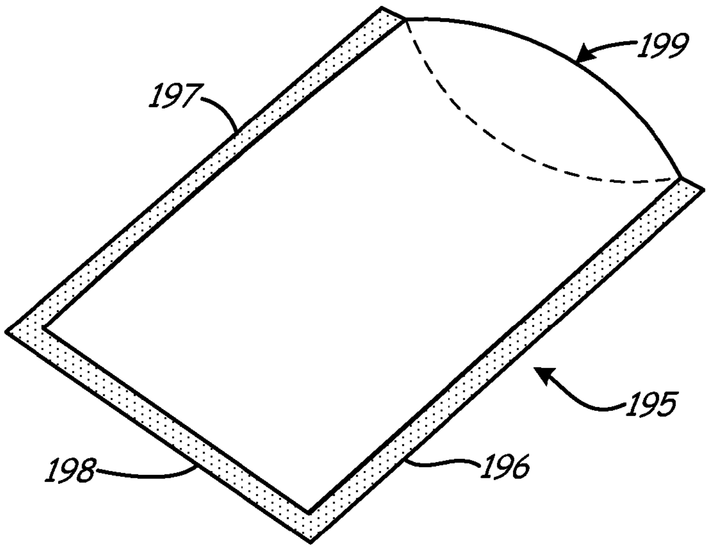
FIG. 23 is a perspective view of a pouch made pursuant to the process of FIG. 22.
Figure 24:
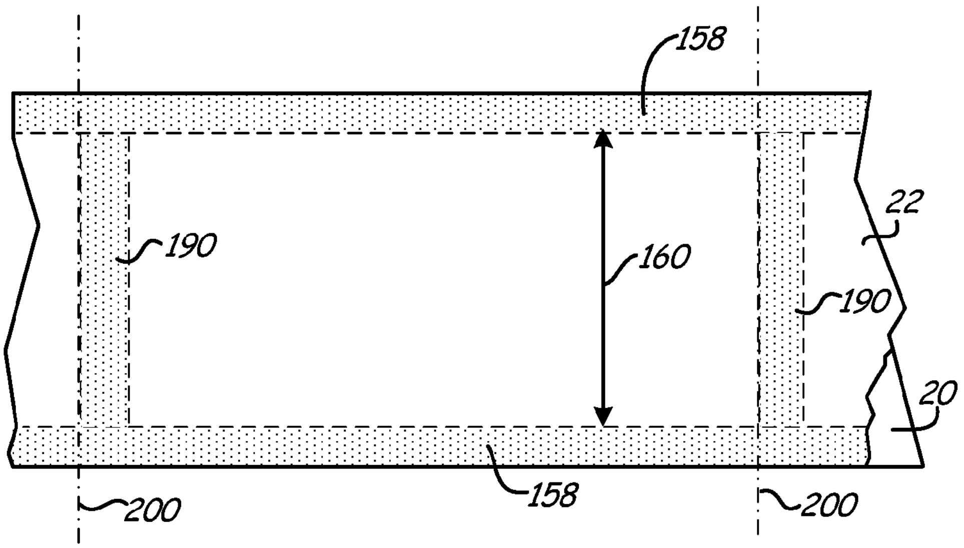
FIG. 24 is a plan view of another alternative process for making pouches such as the pouch illustrated in FIG. 23.

The process disclosed herein for making elastic labeling bands may also be employed to make pouches. FIG. 22 shows a web assembly of a layer of elastomer 22 laminated over a web of tag material 20. The bond zones between the two components are shown as longitudinal bond zones 158, spaced apart by unbonded zone 160 (such as previously illustrated in FIG. 14). In addition, lateral bond zones 190 can be created by removing or masking the release coat across the web of tab material adjacent that bond zone 190. The interruption in the release material may be done periodically as the web is advanced. The web assembly is severed laterally along each lateral bond zone 190, as at separation lines 192. The web assembly is also separated at a separation line 194 spaced between adjacent bond zones 190, as seen in FIG. 22. This process results in the formation of a pouch 195 having two closed sides 196, 197, one closed end 198 (formed by the separation line 192) and one open end 199 (formed by the separation line 194). One side of the pouch may be formed from tag material and the other side of the pouch formed from elastomer material. An alternative means of forming a pouch in this manner is illustrated in FIG. 24, where the web assembly is severed laterally next to each lateral bond zone 190 by a separation line 200. Thus, a pouch is created between each separation line 200, with the closed end of the pouch defined by one of the lateral bond zones 190 and the open end of the pouch defined by the end of the laminated material layers at separation line 200.

There are many different materials that can be utilized in the implementation of the elastic labeling bands described herein. Examples of such materials, not by limitation, will now be provided. In forming an elastic labeling band such as shown in FIGS. 1-3, suitable tag material substrates include (1) 10 mil thick Artisyn™ synthetic paper, product no. UAR 100, available from Protect-All Print Media, Inc., Darrien, Wis., at a width of 8.5 inches, and (2) 7.5 mil thick Teslin™ synthetic paper, 7 mil SP 700, available from Technicote, Inc., Cuyahoga Falls, Ohio (made by PPG Industries, Pittsburgh, Pa.), at a width of 8.5 inches. The flexible securing mechanism or elastomer can be a 50/50 blend of Kraton™ D2104 and Kraton™ D2109, available from Kraton Polymers, LLC, Houston, Tex., used with 0.5% Kemamide U slip additive available from Crompton Corp. (now Chemtura Corporation, Middlebury, Conn.). This elastomer blend adheres well to the illustrative tag material substrates, and the bond between these materials exhibits good bond strength under tension. While no color concentrates are used in these examples, it is possible to colorize the elastomer with appropriate additives. The process melt temperature for this elastomer blend was 389° F., and the elastomer layer was applied onto the tag material substrate to achieve a 16 mil elastomer layer thickness. There are many options for suitable release mechanisms as well. These are among the release agents considered useful in this regard: (1) 7.5 inch wide UV cured release coating atop white ink on the tag material substrate (the ink is Flint Ink RVW 30182, available from Flint Group, Ann Arbor, Mich.); (2) 7.5 inch wide silicone coated PET release, such as Technicote 2 mil L-15 (a loose release liner film silicone coated on one side); and (3) 7.5 inch wide silicone coated PET release with an adhesive backing adhered to the tag material substrate.

In addition, it is also contemplated that the tag material substrate be formed from an elastomer material. As noted above, any suitable material will work, so long as the desired bond can be achieved between the two opposed layers to achieve a labeling band with a loop, wherein one or both sides has elastic stretch properties. In addition, in some applications, it may be desirable to add compatible additives to the elastic tag material or elastomer, to achieve such ends as coloration, opacity, resistance to degradation on exposure to some environments (e.g., sunlight), improved impact properties and adhesion properties, luminescence, scent impregnation, etc.

Although the present invention has been described with reference to preferred embodiments, workers skilled in the art will recognize that changes may be made in form and detail without departing from the spirit and scope of the invention.

What is claimed is:

1. A method of forming an elastic labeling band comprises:
- covering a central portion of a web of tag material with a release agent;
- advancing the web of tag material longitudinally;
- disposing a layer of molten elastomer over the advancing web of tag material, including over the release agent on the central portion thereof, so that the elastomer bonds only to those portions of the web not covered with the release agent;
- curing the elastomer to define, with the web bonded thereto, an advancing web assembly; and
- separating a longitudinal segment from the web assembly to define an elastic labeling band.

2. The method of claim 1 wherein the covering step comprises applying a coating over the central portion of the web.

3. The method of claim 2 wherein the coating includes silicone.

4. The method of claim 1 wherein the release agent comprises a separate layer of material.

5. The method of claim 1 wherein the separating step comprising perforating the web assembly along a lateral separation line.

6. The method of claim 1, and further comprising:
- separating a plurality of longitudinal segments from the web assembly to define a plurality of elastic labeling bands therefrom.

7. The method of claim 1 wherein the separating step comprises:
- cutting a longitudinal strip from the web assembly, and then separating the longitudinal segment from that longitudinal strip.

8. The method of claim 1 wherein the disposing step comprises advancing the web of tag material and the layer of molten elastomer thereon through nip pressure between a lamination roll and a back-up roll.

9. The method of claim 1 wherein the central portion has a longitudinally extending area that is not covered with the release agent.

10. The method of claim 1 wherein the web of tag material has an additional tag material area that extends outwardly past a lateral edge of the layer of elastomer.

11. The method of claim 10 wherein the additional tag material area is selectively separable from the remainder of its respective longitudinal segment of the web assembly.

12. The method of claim 1 wherein the layer of elastomer has an additional elastomer area that extends outwardly past a lateral edge of the web of tag material.

13. The method of claim 12, and further comprising:

forming a loop in the additional elastomer area within the longitudinal segment of the web assembly that defines the elastic labeling band.

14. The method of claim 1, and further comprising:

prior to the separating step, forming the web assembly into a roll.

15. The method of claim 1, and further comprising:

prior to the separating step, die cutting one or more sections of the elastomer along each longitudinal segment of the web assembly to reduce the amount of elastomer on each elastic labeling band.

16. The method of claim 1 wherein longitudinal edge sections of the web of tag material are folded over along each lateral side of the web with the central portion of the web defined therebetween.

17. The method of claim 16 wherein the molten elastomer is disposed over the central portion of the web of tag material and at least a portion of each folded over longitudinal edge section of the web.

18. A method of forming a plurality of elastic labeling bands, the method comprising:

advancing a web of a tag material longitudinally, the web having a central portion disposed between a pair of lateral edge portions, wherein the central portion retains a coating of a release agent and the lateral edge portions being free of the release agent;

disposing a molten elastomer over the advancing web, including over the coating of the release agent on the central portion and over the lateral edge portions;

solidifying the deposited elastomer, wherein the solidified elastomer is bonded to the lateral edge portions to define an advancing web assembly having connection zones at the bonds between the solidified elastomer and the lateral edge portions; and forming perforations along the advancing web assembly to define the plurality of elastic labeling bands, wherein each of the elastic labeling bands includes a tag portion defined by the tag material and a securing mechanism defined by the solidified elastomer, the securing mechanism being bonded to the tag portion at the connection zones.

19. The method of claim 18, and further comprising tearing at least one of the formed perforations to separate at least one of the elastic labeling bands from an adjacent one of the elastic labeling bands.

20. The method of claim 19, and further comprising separating the securing mechanism from the tag portion of at least one of the elastic labeling bands at a location adjacent the coating of the release agent to form a loop between the securing mechanism and the tag portion.

* * * * *